United States Patent
Walker et al.

(10) Patent No.: US 11,824,577 B2
(45) Date of Patent: Nov. 21, 2023

(54) RECEIVE MODULE AND METHOD FOR RECEIVING DIFFERENTIAL SIGNALS IN A SERIAL BUS SYSTEM

(71) Applicant: Robert Bosch GmbH, Stuttgart (DE)

(72) Inventors: Steffen Walker, Reutlingen (DE); Arthur Mutter, Neuhausen (DE); Felix Lang, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/847,476

(22) Filed: Jun. 23, 2022

(65) Prior Publication Data

US 2023/0017910 A1    Jan. 19, 2023

(30) Foreign Application Priority Data

Jul. 8, 2021 (DE) ...................... 10 2021 207 186.4

(51) Int. Cl.
*H04B 1/40* (2015.01)
*H04L 12/40* (2006.01)

(52) U.S. Cl.
CPC ............... *H04B 1/40* (2013.01); *H04L 12/40* (2013.01)

(58) Field of Classification Search
CPC ....... H04B 1/40; H04L 12/40; H04L 25/0272; H04L 2012/40215; G06F 13/4295; G06F 13/4072

See application file for complete search history.

(56) References Cited

U.S. PATENT DOCUMENTS

2016/0196230 A1* 7/2016 Pihet ................... G06F 13/4027
                                                      710/314
2020/0364171 A1* 11/2020 Brando ............... G06F 13/4022

FOREIGN PATENT DOCUMENTS

| DE | 102019214721 A1 | 4/2021 |
| EP | 3852314 A1 | 7/2021 |
| WO | 2019030080 A1 | 2/2019 |

OTHER PUBLICATIONS

ISO 11898-1:2015 Standard, "Road Vehicles—Controller Area Network (CAN)—Part 1: Data Link Layer and Physical Signalling," 2015, pp. 1-74.

* cited by examiner

*Primary Examiner* — Sung S Ahn
(74) *Attorney, Agent, or Firm* — NORTON ROSE FULBRIGHT US LLP; Gerard Messina

(57) ABSTRACT

A receive module. The receive module has a first voltage divider for adjusting a first receive threshold; a first comparator, connected to the first voltage divider, for evaluating differential signals received from a bus of the bus system using the first receive threshold; a second voltage divider for adjusting a second receive threshold or a third receive threshold; a second comparator, connected to the second voltage divider, for evaluating the differential signals using the second or third receive threshold adjusted by the second voltage divider; and a switching unit for the switchover between the second and third receive threshold as a function of an operating mode of the receive module, to which the receive module is to be switched for a first or second communications phase of a communication on the bus, the first and second voltage dividers being connected to the bus in each case.

13 Claims, 7 Drawing Sheets

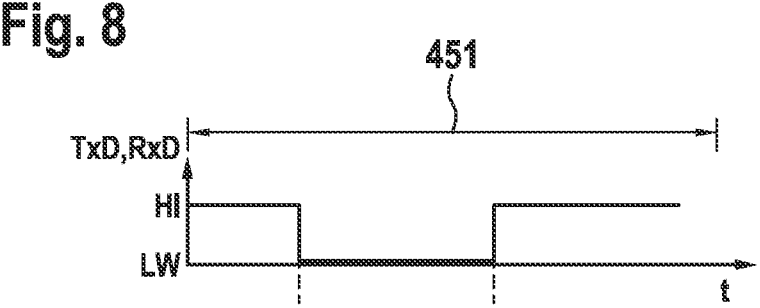
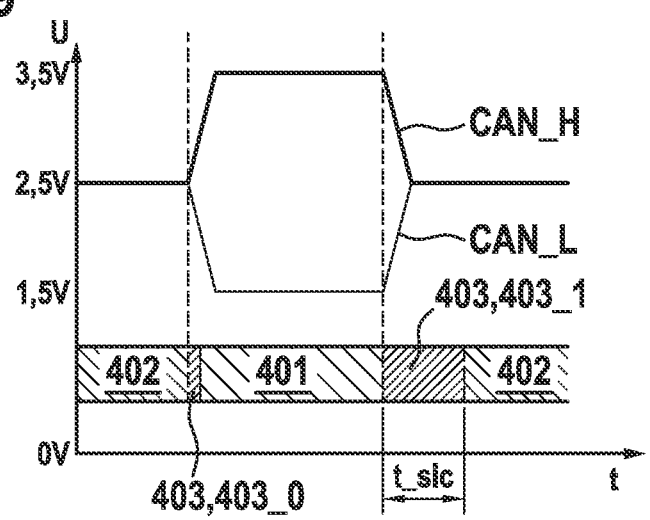

RECEIVE MODULE AND METHOD FOR RECEIVING DIFFERENTIAL SIGNALS IN A SERIAL BUS SYSTEM

CROSS REFERENCE

The present application claims the benefit under 35 U.S.C. § 119 of German Patent Application No. DE 10 2021 207 186.4 filed on Jul. 8, 2021, which is expressly incorporated herein by reference in its entirety.

FIELD

The present invention relates to a receive module and to a method for receiving differential signals in a serial bus system, which may be used in a transmitter/receiver device (transceiver).

BACKGROUND INFORMATION

Serial bus systems are used to transmit messages or data in technical systems. For instance, a serial bus system may enable a communication between sensors and control devices in a vehicle or a technical production plant, etc. Different standards or data transmission protocols exist for the data transmission. Conventional systems include a CAN bus system, an LVDS bus system (LVDS=Low Voltage Differential Signaling), an MSC bus system (MSC=Micro Second Channel), and a 10 BASE-T1S-Ethernet.

In a CAN bus system, messages are transmitted using the CAN and/or CAN FD protocol as described in the ISO-11898-1:2015 standard as a CAN protocol specification with CAN FD. In CAN FD, a back and forth switch between a slow operating mode in a first communications phase (arbitration phase) and a fast operating mode in a second communications phase (data phase) takes place during the transmission on the bus. In a CAN FD bus system, a data transmission rate of more than 1 MBit per second (1 Mbps) is possible in the second communications phase. Most manufacturers use CAN FD in the first step at a 500 kbit/s arbitration bit rate and a 2 Mbit/s data bit rate in the vehicle.

In order to allow for still higher data rates in the second communications phase, successor bus systems for CAN FD exist such as CAN SIC and CAN XL. In CAN-SIC according to the CiA601-4 standard, a data rate of approximately 5 to 8 Mbit/s is able to be achieved in the second communications phase. In CAN XL., a data rate of >10 Mbit/s is required in the second communications phase, the pertinent standard (CiA610-3) currently being specified by the organization CAN in Automation (CiA). In addition to the pure data transport across the CAN bus, CAN XL is meant to also support other functions such as functional safety, data security, and quality of service (QoS). These are elementary properties required in an autonomously driving vehicle.

In all aforementioned CAN-based bus systems, a bus signal CAN_H and, ideally simultaneously, a bus signal CAN_L are separately driven onto a bus for a transmit signal TxD. At least in the first communications phase, a bus state is actively driven in bus signals CAN_H, CAN_L in the process. The other bus state is not driven and comes about due to a termination resistance for bus lines or bus conductors of the bus.

As a rule, transceivers, which are also denoted as CAN transceivers or CAN FD transceivers, etc., are used in a CAN bus system for the individual communications users in order to transmit and receive the bus signals. In CAN XL, the transceivers must be capable of transmitting the bus signals CAN_H, CAN_L onto the bus in the second communications phase using a different physical layer and to receive using a different receive threshold than in the first communications phase. The physical layer corresponds to the bit transmission layer or layer 1 of the conventional OSI (Open Systems Interconnection) model.

In this way, the data are able to be transmitted onto the bus at a considerably higher data rate in the second communications phase than in the first communications phase. In addition, it is thereby possible to distinguish the bus levels of the bus signals CAN_H, CAN_L for the first communications phase from the bus levels of the second communications phase. It is important for a low error rate that a subscriber station that is newly connected to the communication on the bus recognizes in which communications phase the communication is currently conducted on the bus.

It must therefore be ensured for all operating phases of the communication on the bus that a receiving subscriber station of the bus systems is able to correctly identify and evaluate the levels of the bus signals CAN_H, CAN_L.

SUMMARY

It is an object of the present invention to provide a receive module and a method for receiving differential signals in a serial bus system which solve the aforementioned problems. In particular, an object of the present invention is to provide a receive module and a method for receiving differential signals in a serial bus system which enable a reliable and uncomplicated detection of bus signals even when the physical layer is switched over between two communications phases in the communication on the bus.

The object may achieved by a receive module for receiving differential signals in a serial bus system in accordance with the present invention. In accordance with an example embodiment of the present invention, the receive module has a first voltage divider for adjusting a first receive threshold; a first comparator, which is connected to the first voltage divider, for evaluating the differential signals received from a bus of the bus system using the first receive threshold; a second voltage divider for adjusting a second receive threshold or a third receive threshold; a second comparator, which is connected to the second voltage divider, for evaluating the differential signals received from the bus using the second or third receive threshold adjusted by the second voltage divider; and a switching unit for the switchover between the second and third receive thresholds as a function of an operating mode of the receive module to which the receive module is to be switched for a first or second communications phase of a communication on the bus, the first and second voltage dividers being connected to the bus in each case.

The receive module in accordance with an example embodiment of the present invention is designed in such a way that a reliable and uncomplicated detection of bus signals takes place during the operation of the bus system. This applies in particular also to a communication in which the physical layer is switched over between two communications phases for the communication on the bus. The receive module is reliably capable of distinguishing the respective bus states of the individual communications phase and thus the individual communications phases in the communication on the bus.

The receive module in accordance with an example embodiment of the present invention makes it possible to satisfy the specifications for the communication according to the CAN XL requirements, which are codified in the CiA610-3 standard, in particular.

In addition, the receive module in accordance with an example embodiment of the present invention is developed in such a way that the signal levels of the bus signals are able to be converted into a digital receive signal with a simultaneous evaluation of two receive thresholds. The two receive thresholds that are used in the individual communications phases may differ from communications phase to communications phase.

In this way the receive module ensures that a subscriber station which is additionally connected and attempts to integrate itself into the communication on the bus does not interfere with the communication on the bus. This is because the subscriber station is able to reliably recognize with the aid of the receive module whether the bus is free of data traffic. Since the receive module reliably assigns the current bus states, the newly added subscriber station will transmit data onto the bus itself only when the bus is free. Thus, the added connection of a subscriber station that, for example, is initially started up or attempts to integrate itself into the communication on the bus again after an error in the bus communication will not lead to an interruption of the communication on the bus.

As a result, the receive module enables the functionality of using different receive thresholds for the arbitration and data phase. This not only realizes the communication in the bus system at higher bit rates but also ensures that the transmittable bit rate will not be reduced by errors in the communication.

Advantageous further embodiments of the receive module of the present invention are disclosed herein.

The first and the second voltage divider may have a circuit of resistors to which the first and second comparators are connected, the first and second comparator evaluating the differential signals simultaneously.

In one embodiment of the present invention, the first and second voltage divider have the same number of resistors.

In one embodiment of the present invention, the number of resistors in a first resistive path of the first voltage divider for a first signal of the differential signals is equal to the number of resistors in a second resistive path of the second voltage divider for a second signal of the differential signals, the number of resistors in a second resistive path of the first voltage divider for the second signal of the differential signals being equal to the number of resistors in a first resistive path of the second voltage divider for the first signal of the differential signals.

In one embodiment of the present invention, the number of resistors in the first voltage divider in the first resistive path is greater than the number of resistors in the second resistive path, and
the number of resistors in the second voltage divider in the first resistive path is greater than the number of resistors in the second resistive path.

The switching unit may be placed so as to connect or disconnect a resistor with respect to ground.

Optionally, the switching unit is an NMOS transistor.

In addition, the receive module may have a driver for driving a digital receive signal to a communications control unit of a subscriber station of the bus system and a logic circuit for forwarding an output signal of the first comparator and an output signal of the second comparator to the driver when the switching unit has adjusted the second receive threshold, and for forwarding only the output signal of the second comparator to the driver when the switching unit has adjusted the second receive threshold.

The resistors of the second voltage divider (1532) may possibly have a larger semiconductor area than resistors of the first voltage divider. The previously described receive module may be part of a transceiver for a subscriber station for a serial bus system. In addition, the transceiver may have a transmit module for transmitting signals onto a bus of the bus system.

The above-described transceiver may be part of a subscriber station for a serial bus system. Moreover, the subscriber station may be equipped with a communications control device for controlling the communication in the bus system and for generating a digital transmit signal for the transmit module.

The subscriber station is optionally equipped for the communication in a bus system in which an exclusive, collision-free access of a subscriber station to the bus of the bus system is ensured at least intermittently.

The above-mentioned object is furthermore achieved by a method for receiving differential signals in a serial bus system in accordance with the present invention. In accordance with an example embodiment of the present invention, the method has the steps of adjusting a first receive threshold of a receive module with the aid of a first voltage divider, the first voltage divider being connected to a bus of the bus system; adjusting a second receive threshold or a third receive threshold of the receive module with the aid of a second voltage divider, the second voltage divider being connected to the bus; and a switching unit is used for a switchover between the second and third receive threshold as a function of an operating mode of the receive module to which the receive module is to be switched for a first or second communications phase of a communication on the bus; receiving differential signals from the bus using the receive module; evaluating the differential signals received from the bus using the first receive threshold with the aid of a first comparator which is connected to the first voltage divider; and evaluating the differential signals received from the bus using the first or second receive threshold adjusted by the second voltage divider, with the aid of a second comparator which is connected to the second voltage divider.

The present method offers the same advantages as those previously mentioned with regard to the receive module.

Additional possible implementations of the present invention also include not explicitly mentioned combinations of features of embodiments previously described with regard to the exemplary embodiments. One skilled in the art will also add individual aspects as improvements or supplementations to the respective basic form of the present invention, in view of the disclosure herein.

BRIEF DESCRIPTION OF THE DRAWINGS

Below, the present invention will be described in greater detail with reference to the figures and on the basis of exemplary embodiments.

FIG. 8 shows an example of a time characteristic of a digital transmit signal which, according to a second exemplary embodiment, is to be converted in the arbitration phase (SIC operating mode) into bus signals CAN_H, CAN_L for a bus of the bus system of FIG. 1.

FIG. 9 shows the time characteristic of the bus signals CAN_H, CAN_L during the change from a recessive bus state to a dominant bus state and back to the recessive bus state, which are transmitted onto the bus in the arbitration phase (SIC operating mode) in response to the transmit signal from FIG. 8.

Unless mentioned otherwise, identical or functionally equivalent elements in the figures have been provided with the same reference numerals.

DETAILED DESCRIPTION OF EXAMPLE EMBODIMENTS

Figure 1:
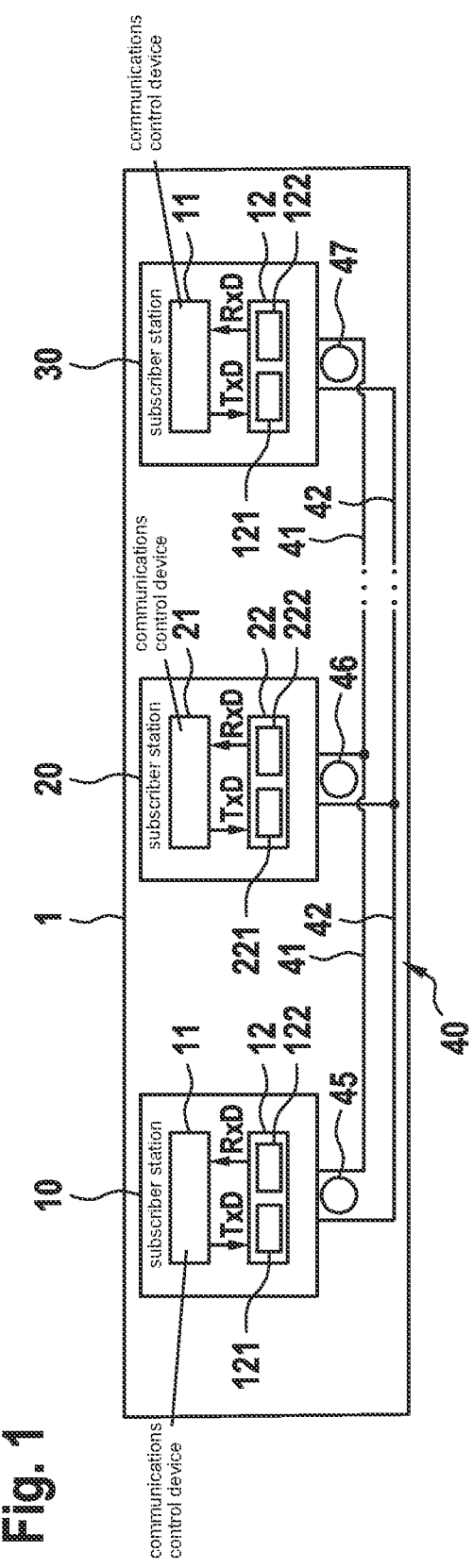
FIG. 1 shows a simplified block circuit diagram of a bus system according to a first exemplary embodiment of the present invention.

FIG. 1 shows a bus system 1, which, for instance, may at least regionally be a CAN bus system, a CAN FD bus system, etc. Bus system 1 may be used in a vehicle, in particular a motor vehicle, an airplane, etc., or in a hospital and other setting.

In FIG. 1, bus system 1 has a multitude of subscriber stations 10, 20, 30, which are connected to a bus 40 or a bus line by a first bus conductor 41 and a second bus conductor 42 in each case. Bus conductors 41, 42 may also be referred to as CAN_H and CAN_L for the signals on bus 40. Messages 45, 46, 47 in the form of signals are able to be transmitted via bus 40 between the individual subscriber stations 10, 20, 30. Subscriber stations 10, 20, 30, for example, may be control units or display devices of a motor vehicle.

As shown in FIG. 1, subscriber stations 10, 30 have a communications control device 11 and a transceiver 12 in each case. Transceiver 12 includes a transmit module 121 and a receive module 122.

Subscriber station 20 has a communications control device 21 and a transceiver 22. Transceiver 22 includes a transmit module 221 and a receive module 222.

Transceivers 12 of subscriber stations 10, 30 and transceiver 22 of subscriber station 20 are directly connected to bus 40 in each case even if this is not shown in FIG. 1.

Communications control devices 11, 21 are used for the control of a communication of the respective subscriber station 10, 20, 30 via bus 40 with at least one other subscriber station of subscriber stations 10, 20, 30 that is connected to bus 40.

Communications control devices 11 prepare and read first messages 45, 47, which are modified CAN messages 45, 47, for example. Modified CAN messages 45, 47 are constructed on the basis of the CAN XL format, for instance. Transceiver 12 is used to transmit and receive messages 45, 47 from bus 40. Transmit module 121 receives a digital transmit signal TxD prepared by communications control device 11 for one of messages 45, 47 and implements it into signals onto bus 40. Receive module 121 receives signals corresponding to messages 45 through 47 transmitted on bus 40 and uses them to generate a digital receive signal RxD. Receive module 122 transmits receive signal RxD to communications control device 11.

Communications control device 21 may be embodied like a conventional CAN controller according to ISO 11898-1: 2015, that is, like a CAN FD-tolerant classic CAN controller or a CAN FD controller. Communications control device 21 prepares and reads second messages 46, e.g., CAN FD messages 46. Transceiver 22 is used to transmit and receive the messages 46 from bus 40. Transmit module 221 receives a digital transmit signal TxD prepared by communications control device 21 and converts this into signals for a message 46 onto bus 40. Receive module 22 receives signals transmitted on bus 40 according to messages 45 to 47 and generates a digital receive signal RxD therefrom. In all other respects, transceiver 22 may be developed like a conventional CAN transceiver.

To transmit messages 45, 47 using CAN SIC or CAN XL, proven characteristics are adopted that are responsible for the robustness and user ease of CAN and CAN FD, in particular a frame structure with an identifier and arbitration according to the conventional CSMA/CR method. In the CSMA/CR method there must be what is referred to as recessive states on bus 40, which are able to be overwritten by other subscriber stations 10, 20, 30 having dominant levels or dominant states on bus 40.

With the aid of the two subscriber stations 10, 30, a generation and then transmission of messages 45 with different CAN formats, in particular the CAN FD format or the CAN SIC format or the CAN XL format, is realizable and also the receiving of such messages 45, as will be described in greater detail in the following text.

Figure 2:
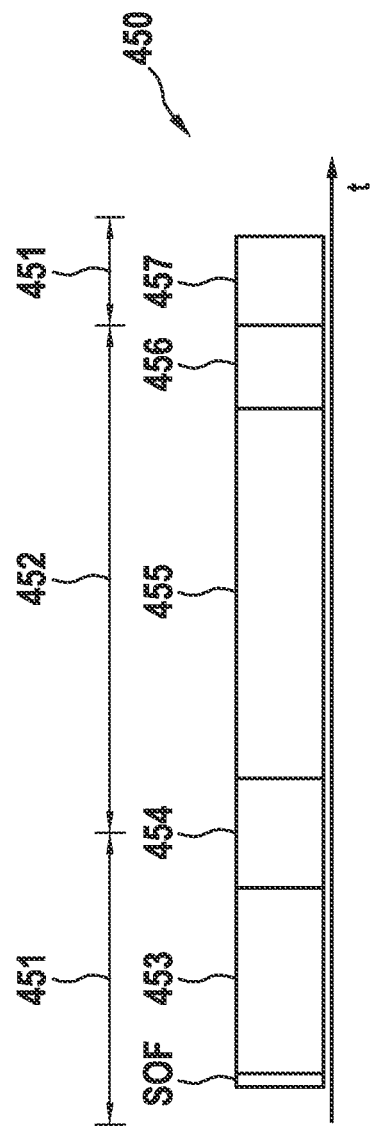
FIG. 2 shows a diagram to illustrate the structure of a message that is able to be sent from a subscriber station of the bus system according to the first exemplary embodiment of the present invention.

FIG. 2 shows a frame 450, which particularly is a CAN XL frame, for message 45, as it is made available by communications control device 11 to transceiver 12 for the transmission onto bus 40. In the process, communications control device 11 sets up frame 450 so as to be compatible with CAN FD in this particular exemplary embodiment. As an alternative, frame 450 is compatible with CAN SIC.

According to FIG. 2, frame 450 for the CAN communication on bus 40 is partitioned into different communications phases 451, 452, that is, an arbitration phase 451 (first communications phase) and a data phase 452 (second communications phase). After a start bit SOF, frame 450 has an arbitration field 453, a control field 454, a data field 455, a check sum field 456, and a frame termination field 457.

In arbitration phase 451, using an identifier (ID) with, for example, bits ID28 to ID18 in arbitration field 453, it is negotiated between subscriber stations 10, 20, 30 in a bitwise manner which subscriber station 10, 20, 30 would like to send message 45, 46 at the highest priority and thus will receive the next exclusive access to bus 40 of bus system 1 for the transmission in subsequent data phase 452. A physical layer as in CAN and CAN FD is used in arbitration phase 451. The physical layer corresponds to the bit transmission layer or layer 1 of the conventional OSI (Open Systems Interconnection) model.

One important point during phase 451 is that the conventional CSMA/CR method is used, which allows for simultaneous access of subscriber stations 10, 20, 30 onto bus 40 without destroying the higher priority message 45, 46. This makes it relatively easy to add further bus subscriber stations 10, 20, 30, which is very advantageous.

The CSMA/CR method means that there must be what is referred to as recessive states on bus 40, which are able to be overwritten by other subscriber stations 10, 20, 30 with dominant levels or dominant states on bus 40. In the recessive state, high-resistance conditions prevail at the individual subscriber station 10, 20, 30, which in combination with the parasites of the bus circuitry results in longer time constants. This leads to a limitation of the maximum bit rate of today's CAN FD physical layer to currently approximately 2 megabits per second in the actual vehicle application.

In data phase 452, in addition to a portion of control field 454, the useful data of the CAN XL frame 450 or of message 45 from data field 455 as well as check sum field 456 are transmitted. A check sum field 456 may include a check sum across the data of data phase 452 including the stuff bits, which are inserted by the transmitter of message 45 after a predefined number of identical bits in each case, in particular 10 identical bits, as an inverse bit. A switch back to arbitration phase 451 takes place again at the end of data phase 452.

At least one acknowledge bit may be included in an end field in frame termination phase 457. In addition, a sequence of 11 identical bits may exist, which indicates the end of CAN XL frame 450. Using the at least one acknowledge bit, it can be indicated whether or not a receiver has detected an error in received CAN XL frame 450 or message 45.

A transmitter of message 45 begins with the transmission of bits of data phase 452 onto bus 40 only when subscriber station 10 as the transmitter has won the arbitration and subscriber station 10 as the transmitter thus has exclusive access to bus 40 of bus system 1 for the transmission.

Thus, in arbitration phase 451 as the first communications phase, subscriber stations 10, 30 partly, in particular up to (including) the FDF bit, use a format from CAN/CAN FD according to ISO11898-1:2015. However, in comparison with CAN or CAN FD, an increase in the net data transmission rate, especially to up to more than 10 megabits per second, is possible in data phase 452 as the second communications phase. In addition, an increase in the size of the useful data per frame is possible, in particular to approximately 2 Kbytes or any other value.

Figure 3:
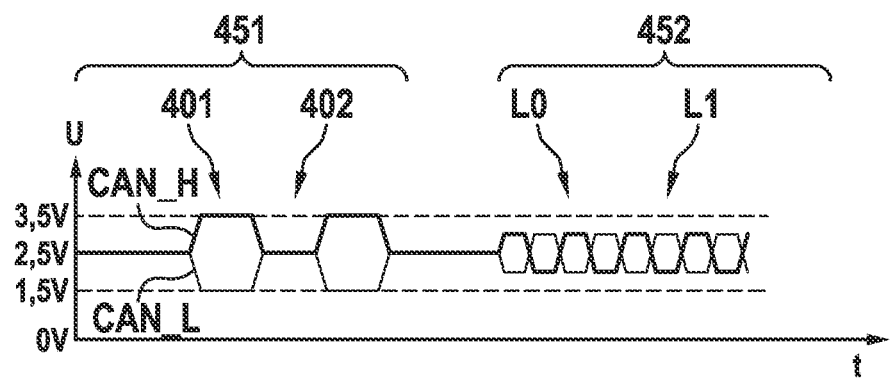
FIG. 3 shows an example of the ideal time characteristic of bus signals CAN_H, CAN_L in the bus system of FIG. 1.

FIG. 3 shows on the left side that in arbitration phase 451, subscriber stations 10, 20, 30 transmit signals CAN_H, CAN_L onto bus 40, which alternatingly have at least one dominant state 401 or at least one recessive state 402. After the arbitration in arbitration phase 451, one of subscriber stations 10, 20, 30 will have been determined to be the winner. Let it be assumed that subscriber station 10 has won the arbitration. Transceiver 12 of subscriber station 10 then switches its physical layer from a first operating mode (SLOW) to a second operating mode (FAST_TX) at the end of arbitration phase 451 because subscriber station 10 is the transmitter of message 45 in data phase 452. Transmit module 121 then generates in data phase 452 or in second operating mode (FAST_TX) the states L0 or L1 for signals CAN_H, CAN_L onto bus 40 as a function of a transmit signal TxD one after the other and thus in a serial fashion.

The frequency of signals CAN_H, CAN_L may be higher in data phase 452 as illustrated on the right side in FIG. 3. As a result, the net data transmission rate in data phase 452 is greater in comparison with arbitration phase 451. In contrast, at the end of arbitration phase 451, transceiver 12 of subscriber station 30 switches its physical layer from the first operating mode (SLOW) to a third operating mode (FAST_RX) because subscriber station 30 is only the receiver, i.e., not the transmitter, of frame 450 in data phase 452. After arbitration phase 451 has ended, all transceivers 12 of subscriber stations 10, 30 switch their operating mode to the first operating mode (SLOW). As a result, all transceivers 12 likewise switch over their physical layer.

Figure 4:
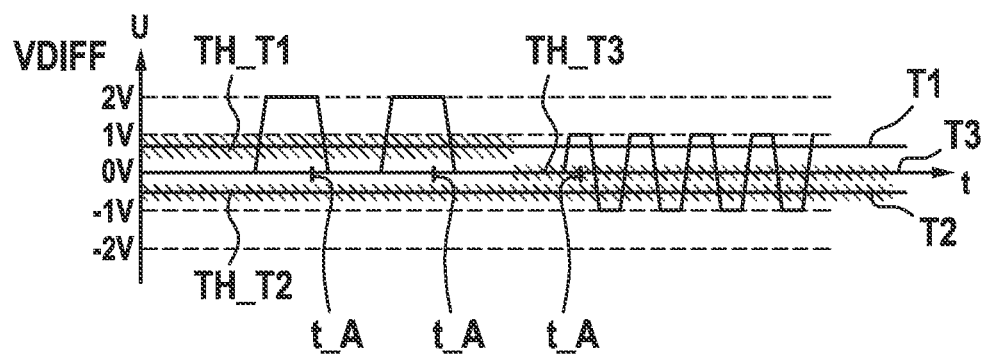
FIG. 4 shows the time characteristic of a differential voltage VDIFF that comes about on the bus of the bus system in response to the bus signals from FIG. 3.

According to FIG. 4, in the ideal case, a differential signal VDIFF=CAN_H−CAN_L with values of VDIFF=2V for dominant states 401 and VDIFF=0V for recessive states 402 forms on bus 40 in arbitration phase 451. This is illustrated on the left side in FIG. 4. In contrast, a differential signal VDIFF=CAN_H−CAN_L with states L0, L1 forms on bus 40 in data phase 452, as illustrated on the right side in FIG. 4. State L0 has a value VDIFF=1V. State L1 has a value VDIFF=−1V.

Receive module 122 is able to distinguish states 401, 402 using two of the receive thresholds T1, T2, T3 in each case, which lie in ranges TH_T1, TH_T2, TH_T3. For this purpose, receive module 122 samples the signals from FIG. 3 or FIG. 4 at instants t_A. To evaluate the sampling results, receive module 122 uses receive threshold T1 of 0.7V, for example, and receive threshold T2 of −0.35V, in arbitration phase 451. In contrast, in data phase 452, receive module 122 uses only signals that were evaluated using receive threshold T3. In the switchover between the first to the third operating mode (SLOW, FAST_TX, FAST_RX), which were previously described with reference to FIG. 3, receive module 122 switches over receive thresholds T2, T3 in each case, as described in the following text.

Receive threshold T2 is used to detect whether bus 40 is free when subscriber station 12 is newly connected to the communication on bus 40 and attempts to integrate itself into the communication on bus 40. Receive threshold T2 is abbreviated to OOB (out-of-boundary) in the standard for CAN. The conditions for a traffic-free CAN XL bus are that no dominant state 401 occurs, which typically has differential voltage VDIFF=2V. Thus, receive threshold T1 of 0.7V, for example, may not be exceeded. In addition, no levels according to state L1, which typically have differential voltage VDIFF=2 V−1 V, may occur. Thus, receive threshold T2 of −0.35V, for instance, may not be undershot.

Each subscriber station 10, 30 switches the operating mode of transceiver 12 to the operating mode of arbitration phase 451 when subscriber station 12 is newly connected to the communication on bus 40.

For one, connecting subscriber station 10 may be required when subscriber station 10 is initially started and is to be integrated into the communication on bus 40. For another, the connection of subscriber station 10 may become necessary when subscriber station 10 attempts to integrate itself into the communication on bus 40 again following an error in the bus communication. Only when it is detected that the bus is free may subscriber station 10 transmit data onto bus 40 itself in the mentioned cases, in particular messages 45, 47.

The following table 1 shows the values that are adjustable for the individual receive thresholds on bus 40. VDIFF_min indicates the lower limit for the individual ranges TH_T1, TH_T2, TH_T3 that may minimally be adjusted for the corresponding receive threshold T1, T2, T3 in V. VDIFF type indicates the value that is typically or usually adjusted for corresponding receive threshold T1, T2, T3 in V. VDIFF_max indicates the upper limit for individual ranges TH_T1, TH_T2, TH_T3 that may maximally be adjusted in V for corresponding receive threshold T1, T2, T3.

TABLE 1

Tolerance ranges of receive thresholds T1, T2, T3

| Receive Threshold | VDIFF_min in V | VDIFF_type in V | VDIFF_max in V | Tolerance in V |
|---|---|---|---|---|
| T1 | 0.5 | 0.7 | 0.9 | +/−0.2 |
| T2 | −0.45 | −0.35 | −0.25 | +/−0.1 |
| T3 | −0.1 | 0.0 | +0.1 | +/−0.1 |

Figure 5:
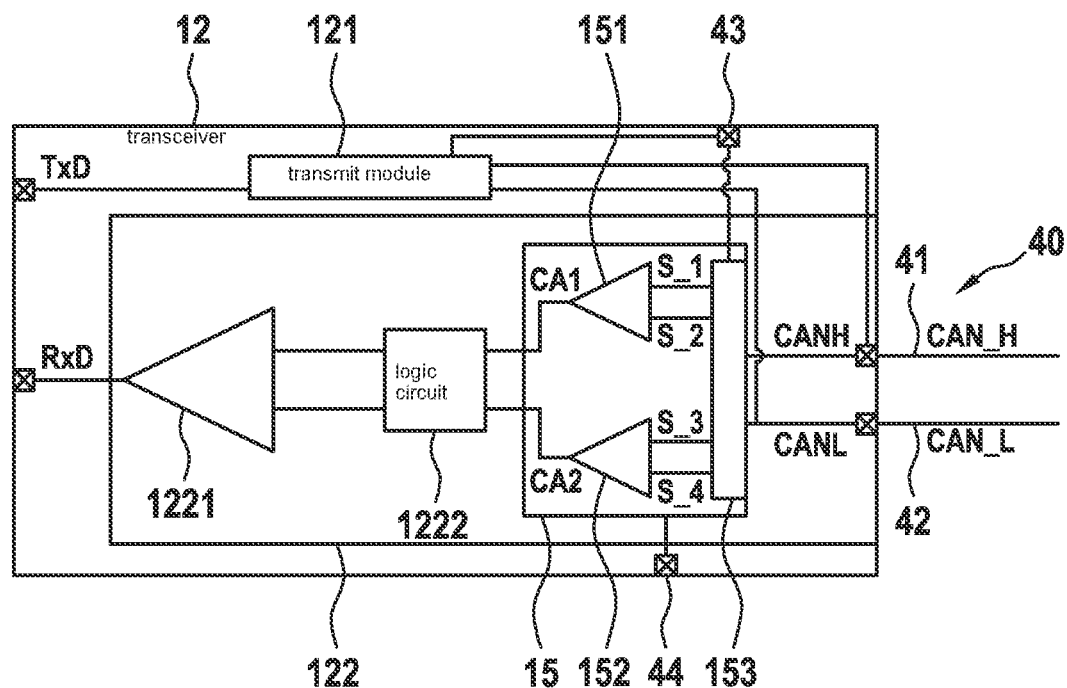
FIG. 5 shows a simplified block circuit diagram of a transceiver having a receive module for a subscriber station of the bus system according to the first exemplary embodiment of the present invention.

FIG. 5 shows the basic structure of transceiver 12 of subscriber station 10. Transmit module 121 is shown only in greatly simplified form. Transmit module 121 is directly connected to bus 40 in order to be able to send transmit signal TxD of communications control device 11 onto bus 40 for the generation of signals according to FIG. 3 on bus 40.

Receive module 122 has a driver 1221 for the digital receive signal RxD, a logic circuit 1222 and a receive circuit 15. Receive circuit 15 has a first receive comparator 151, a second receive comparator 152, and a receive stage 153. Receive comparators 151, 152 are low-voltage comparators in each case.

Receive circuit 15 is connected between bus 40 and logic circuit 1222. Driver 1221 is connected to the output of logic circuit 1222. Driver 1221 drives or transmits the digital receive signal RxD to communications control device 11.

In receive circuit 15, receive stage 153 is connected to bus 40. During the operation of bus system 1, receive stage 153 generates signals S_1, S_2 from signals CAN_H, CAN_L and forwards them to first receive comparator 151. First receive comparator 151 generates a comparator output signal CA1 from signals S_1, S_2.

In addition, receive stage 153 also generates signals S_3, S_4 from signals CAN_H, CAN_L while bus system 1 is in operation and outputs them to second receive comparator 152. Second receive comparator 152 generates comparator a output signal CA2 from signals S_3, S_4.

Depending on the operating mode of transceiver 12, logic circuit 1222 is designed to output signal CA1 and signal CA2 to driver 1221 or to output only signal CA2 to driver 1221. To this end, logic circuit 1222 may include at least one AND gate. As an alternative, logic circuit 1222 has other logic components in order to fulfill the function of receive module 122 described in the following text.

Figure 6:
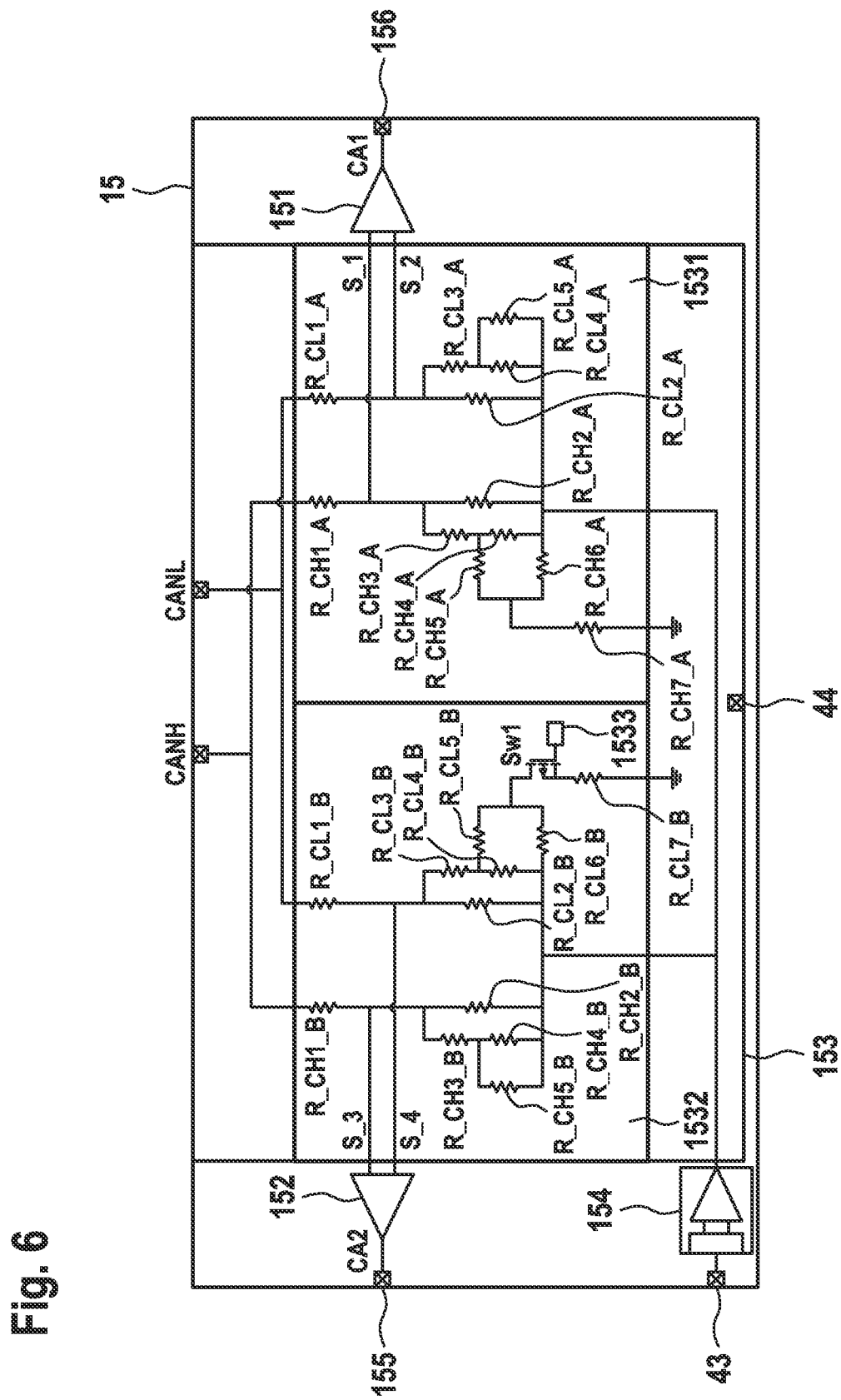
FIG. 6 shows a circuit diagram of a receive module according to a first exemplary embodiment of the present invention.

Receive stage 153 and its wiring with logic circuit 1222 are described in greater detail with the aid of FIG. 6.

As illustrated in FIG. 6, receive circuit 15 furthermore has a bus bias source (bus biasing) 154, which supplies a voltage CAN_SUPPLY/2 to receive stage 153. CAN_SUPPLY=5V usually applies. In this case, bus bias source 154 supplies a voltage of 2.5V to receive stage 153.

Receive stage 153 has a first voltage divider 1531, a second voltage divider 1532, a switching unit Sw1, and an operating mode adjustment unit 1534. First and second voltage dividers 1531 are supplied with the same voltage by bus bias source 154, in particular 2.5V for the recessive state 402 (FIG. 3).

First voltage divider 1531 and second voltage divider 1532 are resistive voltage dividers or resistor voltage dividers.

First voltage divider 1531 has a first to seventh resistor R_CH1_A to R_CH7_A for bus signal CAN_H. First resistor R_CH1_A is connected at its one end to bus line 41 (CANH). At its other end, first resistor R_CH1_A is connected in series to a parallel circuit made up of second resistor R_CH2_A and a series circuit of third and fourth resistors R_CH3_A, R_CH4_A. An end of fifth resistor R_CH_5 is connected at the connection of resistors R_CH3_A, R_CH4_A. In addition, fourth resistor R_CH4_A is connected at its other end to an end of sixth resistor R_CH6_A. At their other ends, resistors R_CH5_A, R_CH6_A are connected to seventh resistor R_CH7_A. At its other end, resistor R_CH7_A is connected to ground and thus to connection 44.

In addition, voltage divider 1531 has an eighth to twelfth resistor R_CL1_A to R_CL5_A for the bus signal CAN_L. Eighth resistor R_CL1_A is connected to bus line 42 (CANL) at its one end. At its other end, resistor R_CL1_A is connected in series with a parallel circuit made up of ninth resistor R_CL2_A and a series circuit of tenth and eleventh resistors R_CL3_A, R_CL4_A. An end of twelfth resistor R_CL5-A is connected at the connection of resistors R_CL3_A, R_CL4_A. Resistors R_CL2_A, R_CL4_A, R_CL5_A moreover are connected at their respective connection to the connection of resistors R_CH2_A, R_CH4_A, R_CH6_A.

A first input of first comparator 151 is connected to the connection between the first and second resistor R_CH1_A, R_CH2_A. A second input of first comparator 151 is connected to the connection between the eighth and ninth resistor R_CL1_A, R_CL2_A.

The resistive path across resistor R_CH7_A to ground adjusts the receive threshold T1 of FIG. 4.

Second voltage divider 1532 has a first to seventh resistor R_CL1_B to R_CL7_B for bus signal CAN_H. First resistor R_CL1_B is connected at its one end to bus line 41 (CANL). At its other end, first resistor R_CL1_B is connected in series to a parallel circuit of second resistor R_CL2_B and a series circuit of third and fourth resistor R_CL3_B, R_CL4_B. An end of fifth resistor R_CL5_B is connected to the connection of resistors R_CL3_B, R_CL4_B. In addition, fourth resistor R_CL4_B is connected at its other end to an end of sixth resistor R_CL6_B. Resistors R_CL5_B, R_CL6_B are connected to switching unit Sw1 at their other ends. Switching unit Sw1 is furthermore connected to resistor R_CL7_B. At its other end, resistor R_CL7_B is connected to ground and thus to connection 44.

In addition, second voltage divider 1532 has an eighth to twelfth resistor R_CH1_B to R_CH5_B for bus signal CAN_L. First resistor R_CH1_B is connected at its one end to bus line 42 (CANH). At its other end, first resistor R_CH1_B is connected in series with a parallel circuit of ninth resistor R_CH2_B and a series circuit of tenth and eleventh resistor R_CH3_B, R_CH4_B. An end of twelfth resistor R_CH5_B is connected at the connection of resistors R_CH3_B, R_CH4_B. In addition, resistors R_CH2_B, R_CH4_B, R_CH5_B are connected at their respective connection to the connection of resistors R_CH2_B, R_CH4_B, R_CH6_B.

A first input of second comparator 152 is connected to the connection between the first and second resistor R_CH1_B, R_CH2_B. A second input of second comparator 152 is connected to the connection between the eighth and ninth resistor R_CL1_B, R_CL2_B.

If switch Sw1 is switched appropriately, the resistive path adjusts receive threshold T2 of FIG. 4 across resistor R_CL7_B to ground or to connection 44. If switch Sw1 is switched in such a way that the path to resistor R_CL7_B is not conductive, receive threshold T3 of FIG. 4 is adjusted.

The circuit of the resistors in the resistance networks of voltage dividers 1531, 1532 has a symmetrical development.

To comply with the demand of the input resistance Rin at CANH and CANL, the resistance divider paths of voltage dividers 1531, 1532 have half of the value due to the dual structure. In this context, Rin_CANH and Rin_CANL=25 kOhm . . . 50 kOhm applies. An input resistance Rin of 37.5 kOhm is typically selected for the connection (pin) for the signal CAN_H and for the connection (pin) for the signal CAN_L. In this case, the described resistive paths of voltage dividers 1531, 1532 have the following special development. The path of CANH across resistor R_CH1_A of first voltage divider 1531 relative to ground or connection 44 for CAN_GND has a resistance value of approximately 2*37.5 kOhm. The path from CANH across resistor R_CH1_B of second voltage divider 1532 relative to ground or connection 44 for CAN_GND has a resistance value of approximately 2*37.5 kOhm. The path from CANL across resistor R_CL1_A of first voltage divider 1531 relative to ground or connection 44 for CAN_GND has a resistance value of approximately. The path from CANL across resistor R_CL1_B of second voltage divider 1532 relative to ground or connection 44 for CAN_GND has a resistance value of approximately 2*37.5 kOhm.

Since half of the tolerance is required (+/−100 mV) at thresholds T2, T3 than in the case of threshold T1 (+/−200 mV) according to the previous table 1, the resistors of first voltage divider 1531 have a different development than the resistors of second voltage divider 1532. The resistors of second voltage divider 1532 have a larger semiconductor area, in particular silicon area (Si area) than the resistors of first voltage divider 1531. This results in less variation of the receive threshold, as required according to table 1.

In the example of FIG. 6, switching unit Sw1 is a transistor, in particular an NMOS transistor. The abbreviation "NMOS" denotes an n-channel MOSFET, the abbreviation "MOSFET" being used for metal oxide semiconductor field effect transistors. When operating mode adjustment unit 1533 actuates switching unit Sw1 by a signal having the value "high", then switching unit Sw1 is conductive or closed. In this case, the resistive path to ground 43 is set across resistor R_CL7_B. The resistive path across resistor R_CL7_B to ground adjusts receive threshold T2 of FIG. 4, as previously described.

If operating mode adjustment unit 1533 actuates the switching unit by a signal having the value "low", then switching unit Sw1 is not conductive or open. In this case, the resistive path to ground 43 across resistor R_CH7_A is switched off and the receive threshold T3 of FIG. 4 is set.

In connection with comparators 151, 152 and the digital output signals CA1, CA2 they generate, the following applies to an NMOS transistor as a switching unit Sw1.

TABLE 2

Assignment of comparator output signals and receive thresholds

| | Detected Receive Threshold | |
|---|---|---|
| Signal | Sw_thres = high (SLOW operating mode) | SW_thres = low (FAST_TX-/FAST-RX operating mode) |
| CA1 | T1 | T1 |
| CA2 | T2 | T3 |

In other words, when a signal sw_thres of operating mode adjustment unit 1533 supplies the value "high", then first comparator 1531 supplies a signal CA1 for which signals S_1, S_2 were evaluated using threshold value T1, and second comparator 1532 supplies a signal CA2 for which the signals S_3, S_4 were evaluated using receive threshold T2. In other words, first comparator 1531 supplies the detection of threshold T1, and second comparator 1532 supplies the detection of threshold T2.

On the other hand, if signal sw_thres of operating mode adjustment unit 1533 supplies the value "low", then first comparator 1531 supplies a signal CA1 for which signals S_1, S_2 were evaluated using receive threshold T1, and second comparator 1532 supplies a signal CA2 for which signals S_3, S_4 were evaluated using receive threshold T3. In other words, first comparator 1531 supplies the detection of threshold T1, and second comparator 1532 supplies the detection of threshold T3.

As a result, voltage dividers 1531, 1532 form a dual divider structure. Voltage dividers 1531, 1532 divide the bus voltages that are generated by signals CAN_H, CAN_L down to values that are able to be processed by comparators 151, 152.

Because of the dual divider structure of receive stage 15, it is possible to check two different receive thresholds of receive thresholds T1, T2, T3 independently of one another and also at the same time or simultaneously. In addition, a switchover between two receive thresholds of receive thresholds T1, T2, T3 is able to take place with the aid of switching unit Sw1, actuated by operating mode adjustment unit 1534. As a result, either receive thresholds T1, T2 according to FIG. 4 may be checked independently of one another and simultaneously, or receive thresholds T1, T3 according to FIG. 4 are able to be checked independently of one another and simultaneously. Thus, two of the three receive thresholds T1, T2, T3 are switchable to the third receive threshold depending on the requirements.

Thus, operating mode adjustment unit 1533 adjusts receive thresholds T1, T2, T3 according to the currently demanded operating mode (SLOW, FAST_TX, FAST_RX) of transceiver 12.

Figure 7:
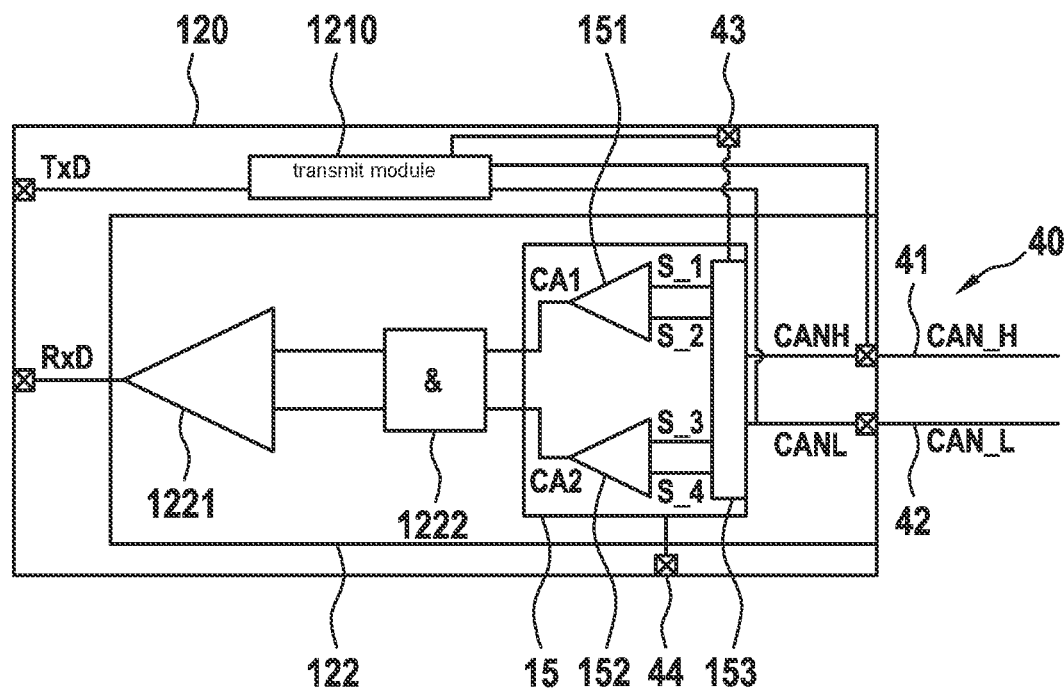
FIG. 7 shows a simplified block circuit diagram of a transceiver having a receive module for a subscriber station of the bus system according to a second exemplary embodiment of the present invention.

FIG. 7 shows a transceiver 120 according to a second exemplary embodiment. Transceiver 120 is able to be used instead of a transceiver 12 in bus system 1 of FIG. 1.

Transceiver 120 has a transmit module 1210 and a receive module 122. In many parts, transmit module 1210 is developed similar to transmit module 121 according to the first exemplary embodiment. For that reason only the differences from the first exemplary embodiment are described in the following text.

In contrast to the first exemplary embodiment, transmit module 1210 generates signals CAN_H, CAN_L for the two communications phases on bus 40, as described in the following text with the aid of FIG. 8 to FIG. 11.

FIG. 8 shows an example of a part of the digital transmit signal TxD which transmit module 121 receives from communications control device 11 in arbitration phase 451 and then generates signals CAN_H, CAN_L therefrom for bus 40. In FIG. 8, transmit signal TxD changes from a state LW (=low) to a state HI (=high) and back again to the state LW (=low).

In the ideal case, receive signal RxD is identical to transmit signal TxD. In such an ideal case there is no transmission delay/propagation time, in particular across bus 40, and no possible receiving error.

As illustrated in greater detail in FIG. 9, transmit module 121 is able to generate the signals CAN_H, CAN_L of FIG.

9 for bus conductors 41, 42 for transmit signal TxD of FIG. 8 in the CAN SIC or CAN XL operating mode. In contrast to FIG. 3, a state 403 (sic) additionally exists in the signals of FIG. 9. State 403 (sic) may have a different length, as illustrated by state 403_0 (sic) in the transition from state 402 (rec) to state 401 (dom) and state 403_1 (sic) in the transition from state 401 (dom) to the state 402 (rec). State 403_0 (sic) is shorter in time than state 403_1 (sic). Transmit module 1210 is switched to a SIC operating mode (SIC mode) for the generation of signals according to FIG. 9.

Passing through the short sic state 403_0 is not required according to the CiA610-3 standard for CAN XL, and the state depends on the implementation type. The time duration of the "long" state 403_1 (sic) is specified for CAN-SIC and also for the SIC operating mode in CAN-XL as t_sic<530 ns, starting with the rising edge on transmit signal TxD of FIG. 8.

In the "long" state 403_1 (sic), transmit module 121 is meant to adapt the impedance between the bus conductors 41 (CANH) and 42 (CANL) as best as possible to the characteristic wave resistance Zw of the bus line used. Here, Zw=1000 Ohm or 1200 Ohm applies. This adaptation prevents reflections and thus allows for the operation at higher bit rates. For simplification purposes, reference is always made to state 403 (sic) or sic state 403 in the following text.

Figure 10:
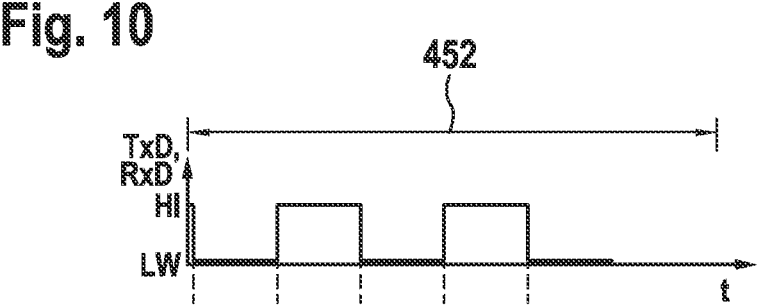
FIG. 10 shows an example of a time characteristic of a digital transmit signal which, according to the second exemplary embodiment, is to be implemented in the data phase in bus signals CAN_H, CAN_L for the bus of the bus system of FIG. 1.

FIG. 10 shows an example of a different part of digital transmit signal TxD, which transmit module 120 receives from communications control device 11 (FIG. 1) in data phase 452 and from which it generates signals CAN_H, CAN_L for bus 40. In FIG. 10, transmit signal TxD changes multiple times from a state HI (=high) to a state LW (=low) and back again to a state HI (=high), and so on.

Figure 11:
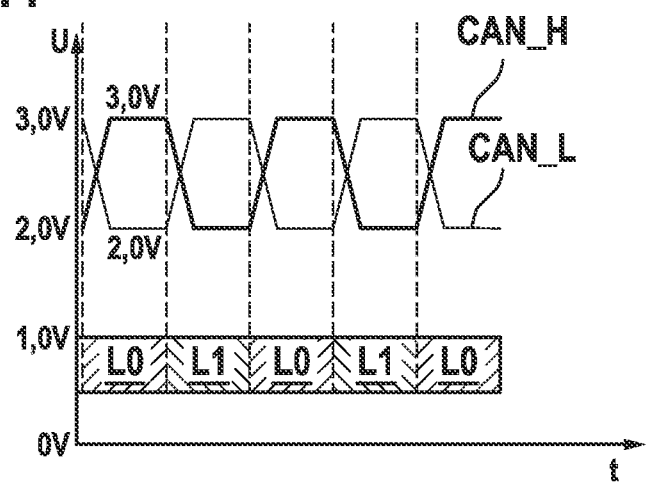
FIG. 11 shows the time characteristic of the bus signals CAN_H, CAN_L that are transmitted onto the bus in the data phase in response to the transmit signal of FIG. 10.

As shown in greater detail in FIG. 11, transmit module 1210 generates the signals CAN_H, CAN_L for transmit signal TxD of FIG. 10 for bus conductors 41, 42 in such a way that state L0 for a state LW (=low) is formed. In addition, state L1 forms for a state HI (=high).

It is possible that at least intermittently no dominant and recessive bus state is used for the two bus states L0, L1, but a first bus state and a second bus state are used instead, which are both driven. One example of such a bus system is a CAN XL bus system.

Receive module 122 is also able to receive the signals according to FIG. 9 and FIG. 11 in the two different communication phases, that is, in the SIC operating mode or arbitration phase 451 and data phase 452. To this end, receive module 122 switches the receive thresholds T2, T3 for the respective operating modes, as previously described with reference to the preceding exemplary embodiment.

Operating mode adjustment unit 1533 thus adjusts receive thresholds T1, T2, T3 according to the currently demanded operating mode (SIC, FAST_TX, FAST_RX) of transceiver 120.

According to a third exemplary embodiment, first voltage divider 1531 adjusts second receive threshold T2 of FIG. 4. Second voltage divider 1532 adjusts either the first or the third receive threshold T1, T3 of FIG. 4. The resistances of voltage dividers 1531, 1532 are adjusted in such a way that the tolerance of +/−100 mV according to the preceding table 1 is met for all thresholds T1, T2, T3, as previously described for thresholds T2, T3 with reference to the first exemplary embodiment.

In this case, logic circuit 1222 is developed in such a way that both comparator signals CA1, CA2 are always forwarded to driver 1221. Receive module 122 always evaluates the signals CAN_H, CAN_L using two receive thresholds at the same time or simultaneously, that is, either using receive thresholds T1, T2 or using receive thresholds T2, T3. In addition, the two receive thresholds are evaluated independently of each other.

This circuit may be advantageous if receive threshold T2 is to be used also in data phase 452, as illustrated in FIG. 4.

All previously described embodiments of transmit module 121, 1210, of receive module 122, of transceivers 12, 22, 120, of subscriber stations 10, 20, 30 of bus system 1 and the method carried out therein according to the first and second embodiments and their modifications are able to be used individually or in all possible combinations. In addition, the following modifications are possible, in particular.

The previously described bus system 1 according to the first and second exemplary embodiments is described with the aid of a bus system based on the CAN protocol. However, bus system 1 according to the first and/or second exemplary embodiment may alternatively also be some other type of communications network in which the signals are transmitted as differential signals. It is advantageous but not necessarily a precondition that an exclusive, collision-free access of a subscriber station 10, 20, 30 to bus 40 be ensured at least for certain time spans.

Bus system 1 according to the first and/or second exemplary embodiment and their modifications in particular is a CAN bus system or a CAN HS bus system or a CAN FD bus system or a CAN SIC bus system or a CAN XL bus system. However, bus system 1 may also be some other communications network in which the signals are transmitted as differential signals or are serially transmitted via bus 40.

Thus, the functionality of the previously described exemplary embodiments can be used in transceivers 12, 22, 120, which are operable in a CAN bus system or a CAN HS bus system or a CAN FD bus system or a CAN SIC bus system or a CAN XL bus system, for instance.

The number and positioning of subscriber stations 10, 20, 30 in bus system 1 according to the first and second exemplary embodiments and their modifications are freely selectable. In particular, only subscriber stations 10 or only subscriber stations 30 are provided in the bus systems 1 of the first or second exemplary embodiment.

What is claimed is:

1. A receive module for receiving differential signals in a serial bus system, comprising:
    a first voltage divider configured to adjust a first receive threshold;
    a first comparator, connected to the first voltage divider, configured to evaluate the differential signals received from a bus of the bus system using the first receive threshold;
    a second voltage divider configured to adjust a second receive threshold or a third receive threshold;
    a second comparator, connected to the second voltage divider, configured to evaluate the differential signals received from the bus using the second or third receive threshold adjusted by the second voltage divider; and
    a switching unit configured for a switchover between the second and the third receive thresholds as a function of an operating mode of the receive module to which the receive module is to be switched for a first or second communications phase of a communication on the bus;
    wherein the first and second voltage dividers are each connected to the bus.

2. The receive module as recited in claim 1, wherein the first and the second voltage divider have a circuit of resistors to which the first and second comparators are connected, and the first and second comparator evaluate the differential signals simultaneously.

3. The receive module as recited in claim 1, wherein the first and second voltage divider have the same number of resistors.

4. The receive module as recited in claim 1, wherein a number of resistors in a first resistive path of the first voltage divider for a first signal of the differential signals is equal to a number of resistors in a second resistive path of the second voltage divider for a second signal of the differential signals, and a number of resistors in a second resistive path of the first voltage divider for the second signal of the differential signals is equal to a number of resistors in a first resistive path of the second voltage divider for the first signal of the differential signals.

5. The receive module as recited in claim 4, wherein in the first voltage divider, the number of resistors in the first resistive path is greater than the number of resistors in the second resistive path, and in the second voltage divider, the number of resistors in the first resistive path is greater than the number of resistors in the second resistive path.

6. The receive module as recited in claim 1, wherein the switching unit is positioned so as to connect or disconnect a resistor to/from ground.

7. The receive module as recited in claim 1, wherein the switching unit is an NMOS transistor.

8. The receive module as recited in claim 1, further comprising:
a driver configured to drive a digital receive signal to a communications control device of a subscriber station of the bus system; and
a logic circuit configured to forward an output signal of the first comparator and an output signal of the second comparator to the driver when the switching unit has adjusted the second receive threshold, and to forward only the output signal of the second comparator to the driver when the switching unit has adjusted the second receive threshold.

9. The receive module as recited in claim 1, wherein resistors of the second voltage divider have a larger semiconductor area than resistors of the first voltage divider.

10. A transceiver for a subscriber station for a serial bus system, comprising:
a transmit module configured to transmit signals onto a bus of the bus system; and
a receive module configured to receive differential signals in the serial bus system, the receive module including:
a first voltage divider configured to adjust a first receive threshold,
a first comparator, connected to the first voltage divider, configured to evaluate the differential signals received from a bus of the bus system using the first receive threshold,
a second voltage divider configured to adjust a second receive threshold or a third receive threshold,
a second comparator, connected to the second voltage divider, configured to evaluate the differential signals received from the bus using the second or third receive threshold adjusted by the second voltage divider, and
a switching unit configured for a switchover between the second and the third receive thresholds as a function of an operating mode of the receive module to which the receive module is to be switched for a first or second communications phase of a communication on the bus,
wherein the first and second voltage dividers are each connected to the bus.

11. A subscriber station for a serial bus system, comprising:
a transceiver for a subscriber station for a serial bus system, including:
a transmit module configured to transmit signals onto a bus of the bus system, and
a receive module configured to receive differential signals in the serial bus system, the receive module including:
a first voltage divider configured to adjust a first receive threshold,
a first comparator, connected to the first voltage divider, configured to evaluate the differential signals received from a bus of the bus system using the first receive threshold,
a second voltage divider configured to adjust a second receive threshold or a third receive threshold,
a second comparator, connected to the second voltage divider, configured to evaluate the differential signals received from the bus using the second or third receive threshold adjusted by the second voltage divider, and
a switching unit configured for a switchover between the second and the third receive thresholds as a function of an operating mode of the receive module to which the receive module is to be switched for a first or second communications phase of a communication on the bus,
wherein the first and second voltage dividers are each connected to the bus; and
a communications control device configured to control communication in the bus system and to generate a digital transmit signal for the transmit module.

12. The subscriber station as recited in claim 11, wherein the subscriber station is configured for the communication in a bus system in which an exclusive, collision-free access of a subscriber station to the bus of the bus system is ensured at least intermittently.

13. A method for receiving differential signals in a serial bus system, comprising the following steps:
adjusting a first receive threshold of a receive module using a first voltage divider, the first voltage divider being connected to a bus of the bus system;
adjusting a second receive threshold or a third receive threshold of the receive module with the aid of a second voltage divider, the second voltage divider being connected to the bus and a switching unit a being used for a switchover between the second and the third receive threshold as a function of an operating mode of the receive module to which the receive module is to be switched for a first or second communications phase of a communication on the bus;
receiving differential signals from the bus using the receive module;
evaluating the differential signals received from the bus using the first receive threshold using a first comparator which is connected to the first voltage; and
evaluating the differential signals received from the bus using a second comparator which is connected to the second voltage divider, using the first or second receive threshold adjusted by the second voltage divider.

* * * * *